United States Patent [19]
Moriya et al.

[11] Patent Number: 4,867,829
[45] Date of Patent: Sep. 19, 1989

[54] PROCESS FOR PRODUCING INTERIOR VEHICULAR TRIM

[75] Inventors: Shigeru Moriya; Sadao Hijikata; Yasuyuki Izuhara, all of Toyota; Akihiro Harada, Kariya; Kunimasa Tsuzuki; Shigeki Nimura, both of Toyota; Hirosi Watanabe, Yokosuka, all of Japan

[73] Assignee: Takashimaya Nippatsu Kogyo Co., Ltd., Toyota, Japan

[21] Appl. No.: 91,592

[22] Filed: Aug. 31, 1987

[30] Foreign Application Priority Data

Jan. 16, 1987 [JP] Japan ................................. 62-8589
Jan. 16, 1987 [JP] Japan ................................. 62-8590
Apr. 18, 1987 [JP] Japan ................................. 62-95865
Jul. 3, 1987 [JP] Japan ................................. 62-167394

[51] Int. Cl.⁴ .................... B32B 31/18; B32B 31/20; B32B 31/26
[52] U.S. Cl. ........................... 156/251; 156/267; 156/285; 156/290; 156/292; 156/308.4
[58] Field of Search ............... 156/212, 213, 251, 285, 156/286, 292, 487, 518, 156, 267, 308.4, 290, 382, 87; 269/21; 264/500, 504, 523, 101, 102; 425/405 R; 279/3

[56] References Cited

U.S. PATENT DOCUMENTS

| | | | |
|---|---|---|---|
| 1,908,682 | 5/1933 | Bronson | 156/156 |
| 3,047,451 | 7/1962 | Beck et al. | 156/251 |
| 3,124,807 | 3/1964 | Frenkel et al. | 156/292 |
| 3,398,811 | 8/1968 | Muller | 156/212 |
| 3,902,944 | 9/1975 | Ashton et al. | 156/156 |
| 3,928,101 | 12/1975 | Tucker | 156/156 |
| 4,032,387 | 6/1977 | Sugiyama et al. | 156/285 |
| 4,391,898 | 7/1983 | Van der Velden | 156/286 |
| 4,457,797 | 7/1984 | Hatchadoorian et al. | 156/285 |
| 4,637,909 | 1/1987 | Lucca | 156/156 |
| 4,707,208 | 11/1987 | Crumbach et al. | 156/285 |
| 4,715,293 | 12/1987 | Knoll | 156/380.9 |

FOREIGN PATENT DOCUMENTS

| | | |
|---|---|---|
| 2452425 | 5/1976 | Fed. Rep. of Germany . |
| 2927121 | 1/1980 | Fed. Rep. of Germany ...... 156/251 |
| 3111467A1 | 6/1982 | Fed. Rep. of Germany . |
| 59-24008 | 6/1984 | Japan . |
| 270139 | 11/1986 | Japan ................................. 156/251 |
| 374842 | 6/1932 | United Kingdom . |
| 453123 | 9/1936 | United Kingdom . |
| 486646 | 6/1938 | United Kingdom . |
| 942148 | 11/1963 | United Kingdom . |
| 2087296A | 5/1982 | United Kingdom . |

*Primary Examiner*—Merrell C. Cashion Jr.
*Attorney, Agent, or Firm*—Frishauf, Holtz, Goodman & Woodward

[57] ABSTRACT

A process for producing interior vehicular trim, comprising covering the surface of a substrate to which a nap-raised ornamental member, and removing the synthetic resin surface material at the part thereof covering the nap-raised ornamental member and along the weld line. The synthetic resin surface material is welded and melt-cut on the peripheral edge of the ornamental member by carrying out the welding while the synthetic resin surface material is lifted up by force from the surface of the nap-raised ornamental member over the part thereof covering the ornmental member. An apparatus for producing interior vehicular trim, comprises an upper platen disposed to oppose matchably to a lower platen for supporting the substrate to which the nap-raised ornamental member has been partly applied, to effect welding of the synthetic resin surface material which was applied over the surface of the substrate, the welding being carried out along the peripheral edge of the ornamental member. The portion of the synthetic resin surface material covering the nap-raised ornamental member is removed by melt-cutting it along the welded line. A lift-up arrangement provided for lifting up the synthetic resin surface material at the part thereof covering the nap-raised ornamental member from the surface of the nap-raised ornamental member at least during the welding and melt-cutting steps.

9 Claims, 7 Drawing Sheets

PROCESS FOR PRODUCING INTERIOR VEHICULAR TRIM

BACKGROUND OF THE INVENTION

This invention relates to a process, and an apparatus, for producing interior vehicular trim, which process is feasible for readily mass-producing interior vehicular trim of good appearance, comprising a substrate whose surface has been decoratively covered with a nap-raised ornamental member such as moquet and carpets and with a synthetic resin surface material.

Widely known and disclosed in Japanese Patent Publication No. 24008/1984 is a process for producing interior automotive trim, comprising covering the entire surface of a substrate to which a nap-raised ornamental member is partly applied, with a synthetic resin surface material, welding the surface material on the peripheral edge of said ornamental member, and removing said synthetic resin surface material at its part covering the ornamental member and along the weld line.

However, many of the synthetic resin surface materials to be used in this type of process are combined with a foamed layer to give a thickness of 2 mm or more.

Accordingly, in an attempt to effect welding and melt-cutting of such a surface material simultaneously, welding pressure may be insufficient if the projection of the melt-cutter from a weld plate for high frequency welding is small, resulting in the failure of giving a clear weld pattern. Alternatively, if an increased welding pressure is used for obtaining clear weld pattern, it will cause sparking. Thus, welding must have been done without increasing the welding pressure and then the setting of the projection of the melt-cutter from the weld plate is great to make thinner the welded portion to facilitate manual stripping off of the surface material along said portion. Such procedures have been troublesome.

There has been also a problem as follows: When the surface of the substrate to which the nap-raised ornamental member has been partly applied is covered with the synthetic resin surface material and part of the surface material is welded on the peripheral edge of said ornamental member, the welded synthetic resin surface material may become protuberant as a superfluously thick portion along the weld line to melt the nap of the ornamental member or to cause the nap-lying to bring about what is called a whitening phenomenon wherein ornamental member looks whitish along the weld line, resulting in an unsatisfactory product appearance.

SUMMARY OF THE INVENTION

This invention has been accomplished to solve the problems as discussed above, aiming at providing a process and apparatus for producing interior vehicular trim, that can obtain a product with a good finish by accurately and readily welding a synthetic resin surface material on the peripheral edge of the ornamental member without bringing about any ill influences such as the whitening phenomenon at the portion along the weld line of the nap-raised ornamental member.

According to this invention, there is provided a process for producing interior vehicular trim, comprising covering the entire surface of a substrate to which an ornamental member is partly applied, with a synthetic resin surface material, welding the surface material on the peripheral edge of said ornamental member, and removing said synthetic resin surface material at its part covering the ornamental member and along the weld line; wherein the surface material is welded and melt-cut on the peripheral edge of said ornamental member by carrying out the welding step while the synthetic resin surface material is lifted up from the surface of the ornamental member over the part thereof covering said ornamental member.

There is also provided an apparatus for producing interior vehicular trim, wherein an upper platen is disposed to oppose matchably to a lower platen for supporting the substrate to which the ornamental member has been partly applied to effect welding of the synthetic resin surface material, had been applied over the surface of the substrate, the welding being carried out along the peripheral edge of the ornamental member. The synthetic resin surface material covering said ornamental member is removed by melt-cutting it along the welded line. The apparatus further comprises a lift-up mechanism for lifting up said synthetic resin surface material at the part thereof covering the ornamental member from the surface of said ornamental member, at least during the welding and melt-cutting steps.

DESCRIPTION OF THE PREFERRED EMBODIMENTS

Figure 1:
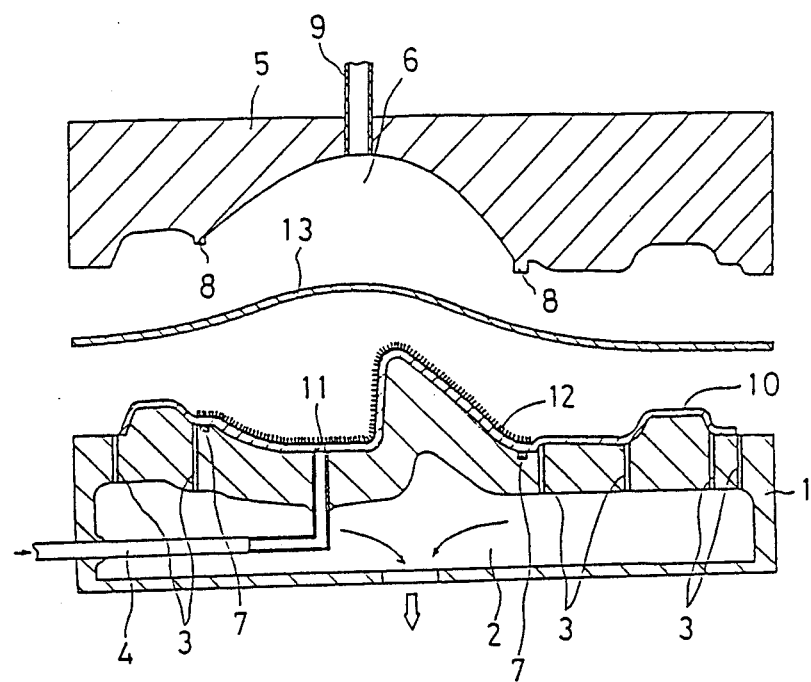
FIG. 1 is a partially cutaway front view showing an example of an apparatus used for a vacuum forming step which is a prior step of the apparatus of this invention in a mold-opened state.

The substrate used in this invention may be of course any of a synthetic resin board or a hard fibrous board without any particular limitation in the material, and may have the structure of a flat plate or a molded substrate with recess and projection. The ornamental member to be applied to the surface of the substrate may include nap-raised fabric or flocked fabric comprising a relatively long nap such as moquet and carpets woven by use of any fiber including chemical fiber, natural fiber and so forth and having a nap length of about 0.5 to 10 mm.

On the other hand, the synthetic resin surface material may be any of those which can be welded by high frequency welding or any other means, without any particular limitation in the material, and there may be generally used sheets of a solid type comprising a thermoplastic synthetic resin or a laminated type having a foamed layer. Depending on the material, the sheets may be provided with a synthetic resin type adhesive agent layer formed on the back surface of the part to be welded and comprising a hot-melt adhesive agent for use in the welding.

As a welding means for welding the synthetic resin surface material on the peripheral edge of the ornamental member, there may be used a high frequency welder, as well as an ultrasonic welder or any other welders. As a fluid which is introduced into the bag member in order to lift up the synthetic resin surface material at its part covering the ornamental member from the surface of the ornamental member in carrying out welding, there may be usually used compressed air. Any other inactive gas and liquid such as water can be used as the fluid in this invention.

An example of this invention will be described below in detail by illustrating a series of steps with reference to the surface material vacuum forming apparatus shown in FIG. 1 to FIG. 3 and the surface material welding apparatus shown in FIG. 4 to FIG. 6. First, in FIG. 1 to FIG. 3, the numeral 1 denotes a supporting mold comprising a vacuum box 2 formed at its lower portion. The mold face is formed to have an uneven mold face provided with vacuum ports 3, and an air supply pipe 4 connected to an air supply source is inserted to open to a portion of the mold face. The numeral 5 denotes an assist mold disposed matchably to the supporting mold 1. The mold face of the assist mold 5 is designed to correspond in its greater part to the mold face of the above supporting mold 1, but part thereof, namely, only the part facing to the part of the supporting mold 1 at which the ornamental member has been set is designed to have a concave mold face which is concave enough to form a necessary hollow space 6 between the mold faces of the assist mold 5 and supporting mold 1 when the molds are matched.

In the drawing, the numeral 7 denotes a soft sealing material partly embedded in the mold face of the supporting mold 1 in the manner that it may slightly protrude from the mold face of the supporting mold 1 in order to keep the balance of a substrate to increase the sealing effect when the substrate is set on the mold face of the supporting mold 1; 8, a pressing-down projection provided on the mold face of the assist mold 5 in such a fashion that it may correspond to the outer shape of the ornamental member; 9, a venting pipe which makes the hollow space 6 open to the atmosphere; and 10, a substrate set on the mold face of the supporting mold 1.

The substrate 10 comprises a synthetic resin plate or a hard fibrous plate originally formed to have recess and projection, and it is provided with small holes 11 and the like to give air-permeability and applied on its entire surface with an adhesive agent. To part of the surface of the substrate 10, there is attached an ornamental member 12 which has been cut in a desired shape after applying, or has been applied after beforehand cutting in a desired shape, a carpet or moquet comprising polyester or polyamide fiber having a nap length of about 0.5 to 10 mm and a softening point of about 70° to 120° C.

The numeral 13 denotes a synthetic resin surface material having been optionally laminated on its back surface with a foamed layer. The synthetic resin surface material 13 comprises a synthetic leather or film capable of being vacuum formed and welded and comprising a thermoplastic synthetic resin such as a polyvinyl chloride resin, a polyethylene resin or a thermoplastic polyester resin, and is to be set between the supporting mold 1 and the assist mold 5 in such a state that it has been heated to an optimum temperature, for example, of about 100° to 200° C. at which it may not be melted but sufficiently softened.

Figure 4:
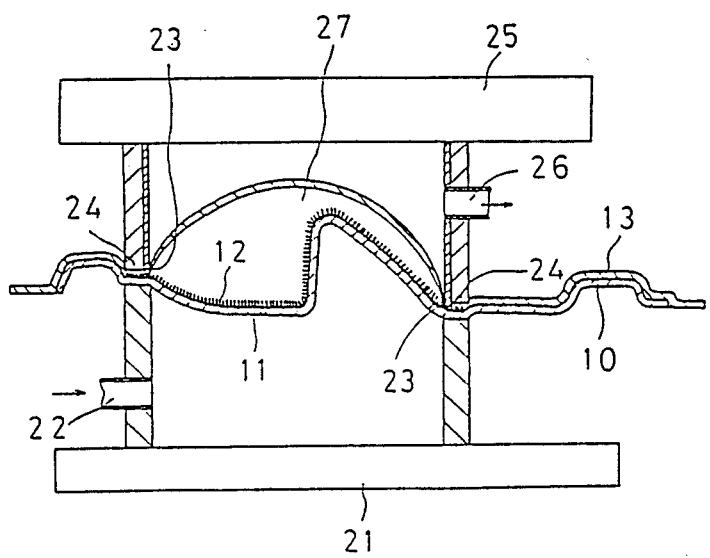
FIG. 4 is a partially cutaway front view showing a first example of the apparatus for carrying out the process of this invention.
Figure 5:
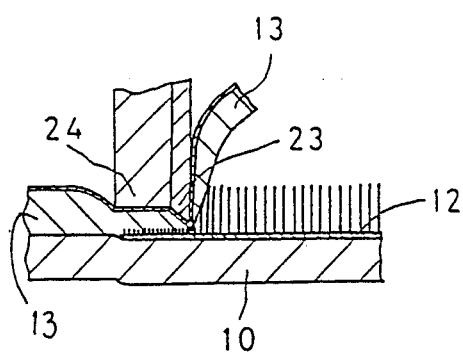
FIG. 5 and FIG. 6 are partially cutaway front views showing a welded and melt-cut portion of the apparatus with an enlarged scale.
Figure 6:
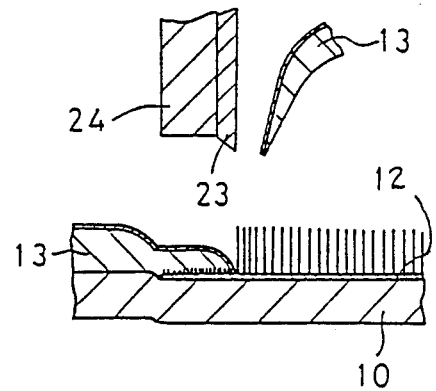

FIG. 4 to FIG. 6 show a first example of the apparatus for melt-cutting and removing the synthetic resin surface material 13 covering ornamental member 12 along the weld line from the intermediate product wherein the substrate 10 having the ornamental member 12 applied partly thereto is covered with the synthetic resin material 13. In the drawings, the numeral 21 denotes a lower platen for welding the surface material 13 with use of a high frequency. The profile line of its upper end receiving face is designed to correspond to the outer shape of the above ornamental member 12, and an air supply pipe 22 connected to an air supply source is inserted On an upper portion of the lower platen 21, there is provided a matchably disposed frame-box type upper platen 25 comprising an electrode plate 24 for high frequency welding equipped with a melt-cutter 23 at its lower end. A suction pipe 26 connected to a vacuum source is inserted to open to the inside open space of the upper platen 25 to impart to the upper platen 25 the function of a vacuum box.

An example will be given below for producing a door trim as the interior automotive trim with use of the apparatus and materials as mentioned above. First, to the surface of the substrate 10 obtained by three-dimensionally forming a woody hard fibrous board into the shape of a door trim with use of a known forming apparatus, a piece of fabric made of polyester fiber, having a nap length of 2 mm and a softening point of 90° C., is partly attached centering the projected portion formed on the surface of the substrate, and is trimmed in a desired shape so that the ornamental member 12 can be beforehand partly applied to the surface of the substrate 10. This is set on the mold surface of the supporting mold 1 on which the assist mold 5 is opened, and at the same time on its upper side a vinyl chloride resin sheet having a foamed layer is set as the synthetic resin surface material 13 in such a state that it has been heated to 150° C. and softened.

The assist mold 5 and the supporting mold 1 are then matched. Here, at the same time with or immediately before the contact of the assist mold 5 with the substrate 10, air with pressure of not lower than the atmospheric pressure, preferably 2 to 6 kg/cm$^2$, is blown from the air supply pipe 4 having been inserted to open to the mold face of the supporting mold 1, so that the synthetic resin surface material 13 may be lifted up at its part positioned over the ornamental member 12 to form the hollow space 6 defined between the assist mold 5 and the supporting mold 1 by a pressure difference. On the other hand, the synthetic resin surface material 13 having been heated and softened is formed on the surface of the substrate 10 by vacuum forming through the vacuum box 2 connected to a vacuum source and the vacuum ports 3 provided in the supporting mold 1.

As a result, since the pressing-down projection 8 is provided on the mold face of the assist mold 5 in such a fashion that it may correspond to the outer shape of the above ornamental member 12, this pressing-down projection 8 presses the peripheral edge of the ornamental member 12 against the substrate 10 on the supporting mold 1 together with part of the synthetic resin surface material 13. Thus, the synthetic resin surface material 13 is partitioned into the part covering the ornamental member 12 and the part covering the substrate 10, with the peripheral edge of the ornamental member 12 as a boundary, and the airtightness can be maintained so that the lifting-up of the part covering the ornamental member 12 by virtue of the air-blowing and the vacuum forming at the other part can be achieved with accuracy.

Accordingly, the synthetic resin surface material 13 heated at the time of the vacuum forming can be prevented from being in contact with the nap-raised part of the ornamental member 12, and there can be obtained an intermediate product such that the synthetic resin surface material 13 is covered on the entire surface of the substrate 10 to which the nap-raised ornamental member 12 is partly applied, and the surface material 13 is attached on the substrate surface except for the area over the ornamental member 12, but a space remains between the surface material 13 and the ornamental member 12.

The assist mold 5 is then opened to take out the intermediate product, and the substrate 10 thereof is set on the lower platen 21 of the surface material welding apparatus (see FIG. 4) in such a manner that the down side of the peripheral edge of the ornamental member 12 attached on the substrate 10 is positioned on a receiving face of the lower platen 21 so as to close the top end opening of the lower platen 21. Thereafter, the upper platen 25 is lowered to bring the electrode plate 24 into contact with the synthetic resin surface material 13, and, at the same time with or immediately before this contact, air of about 2 to 6 kg/cm² is blown from the air supply pipe 22 through the small holes 11 provided in the substrate 10 into the hollow space 27 defined between said substrate 10 and the concave area of the upper platen 25.

As a result, the synthetic resin surface material 13 is lifted up at the part positioned over the ornamental member 12 by the action of this blown air from the air supply pipe 22, the suction from the suction pipe 26, or the blown air and the suction from the suction pipe 26. Under this state, a high frequency current is applied under pressure to weld the part of the synthetic resin surface material 13 on the peripheral edge of the ornamental member 12 by the aid of the electrode plate 4, and at the same time carry out melt-cutting along the weld line by the aid of the melt-cutter 23. Then, the part covering the ornamental member 12, of the synthetic resin surface material 13, is removed on the spot mechanically or by utilizing the pressure difference, or the part covering the ornamental member 12 is cut away in a posterior step after making little the thickness on the part along the weld line.

Figure 7:
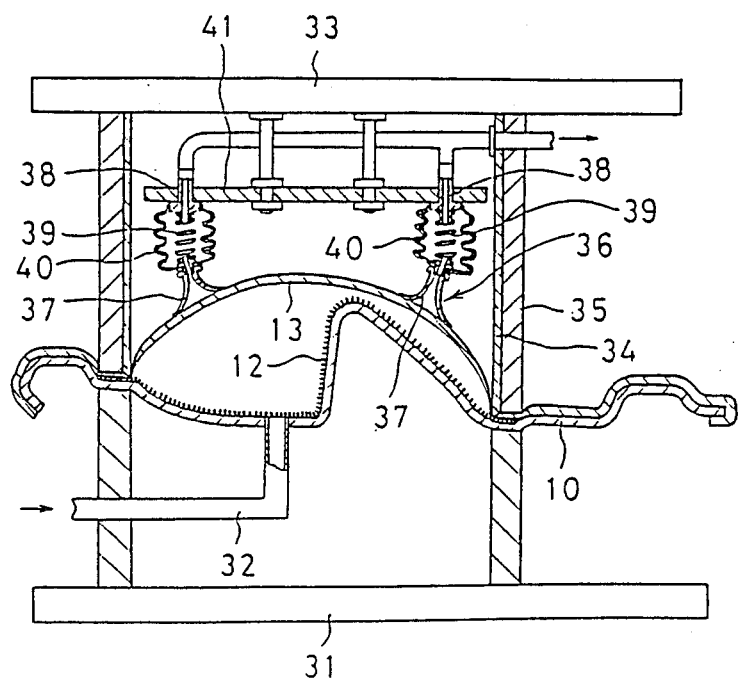
FIG. 7 is a partially cutaway front view showing a second example of the apparatus for carrying out the process of this invention.
Figure 8:
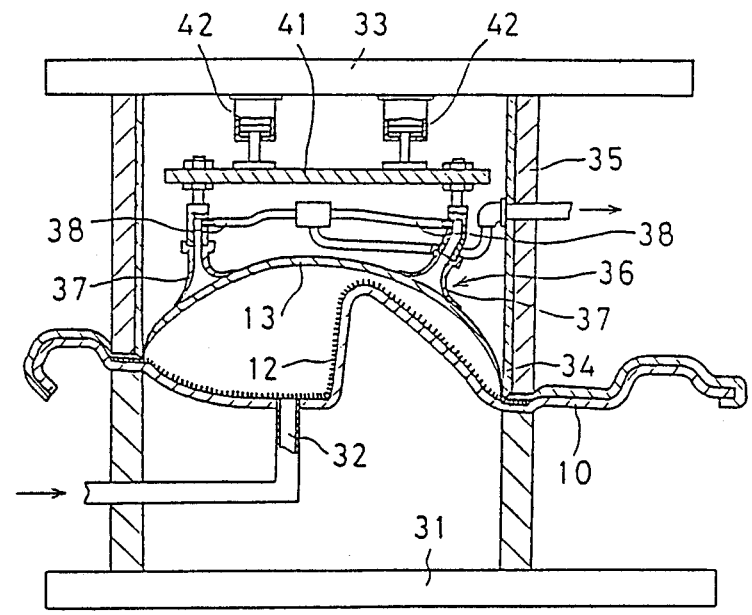
FIG. 8 is a partially cutaway front view showing a third example of the apparatus for carrying out the process of this invention.
Figure 9:
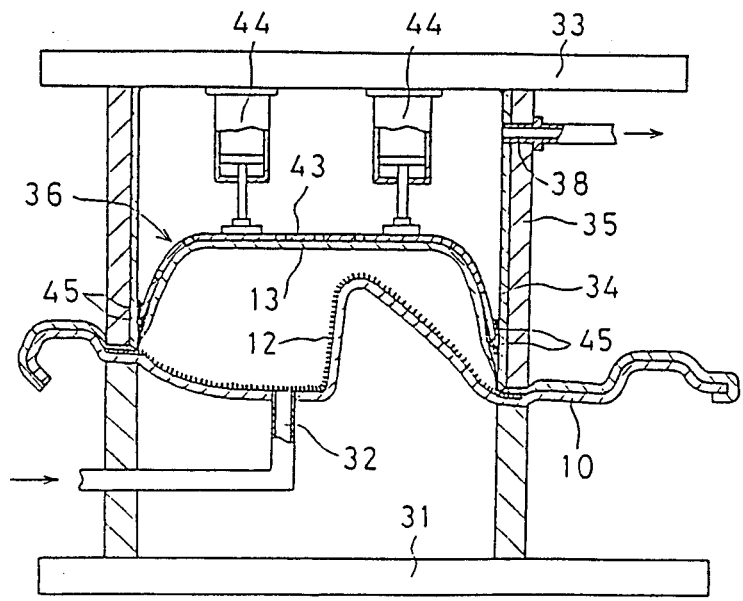
FIG. 9 is a partially cutaway front view showing a fourth example of the apparatus for carrying out the process of this invention.

FIG. 7 to FIG. 9 show another examples of apparatus according to the present invention. A second example shown in FIG. 7 will be described here in detail. The numeral 31 denotes a lower platen for receiving a substrate 10 to which an ornamental member 12 is partly attached and on which a synthetic resin surface material 3 is covered on its entire surface; and 32, an air supply pipe provided in the platen 31, which is used for blowing air in the space between the synthetic resin surface material 13 and the ornamental member 12 to inflate the synthetic resin surface material 13. The numeral 33 denotes an upper platen provided in an upward and downward movable fashion, facing the lower platen 31, and said platen 33 is downward provided with an electrode plate 35 equipped with a melt-cutter 34.

The numeral 36 denotes a suction device upward and downward movably fitted to the platen 33, which comprises a suction cup 37 and a suction pipe 38 and is joined to a fitting base 41 in the form of a universal coupling through bellows 40 internally having a spring 39 and another spring for shape retention. The synthetic resin surface material 13 is sucked up by the action of the positive pressure from the air supply pipe 32 and the negative pressure by the suction device 36, and lifted up from the surface of the ornamental member 12. Thus, welding and melt-cutting is carried out in the state that the surface material 13 is apart from the inner peripheral edge of the weld line on the ornamental member 12. The synthetic resin surface material 13 is cut and separated at the part having been made thin by he melt-cutter 34 by means of the bellows 40 acting to contract upward.

FIG. 8 shows a third example, wherein a suction device 36 comprises a suction cup 37 fitted to a fitting base 41, which is connected to a suction pipe 38, and is made upward and downward movable by means of a cylinder 42 provided on an upper platen 33. Thus, a synthetic resin surface material 13 is lifted up in the same manner as in the example described above and also cut away after the welding.

FIG. 9 further illustrates a fourth example, wherein a suction device 36 comprises a reversed cup-shaped member 43 provided with minute holes and formed in the same outer peripheral shape as the outer peripheral shape of an ornamental member 12, and a cylinder 44 for upward and downward moving said reversed cup-shaped member 43. The synthetic resin surface material 13 is sucked up while giving positive pressure to the space between the lower platen 31 and the reversed cup-shaped member 43 and also giving negative pressure to the space between the upper platen 33 and the reversed cup-shaped member 43. After it was sucked up, welding is carried out, and, after the welding, the reversed cup-shaped member 43 is elevated by operating the cylinder 44 to cut away the synthetic resin surface material 13 having been made to have little thickness. The numeral 45 denotes a sealing material provided along the lower end peripheral edge of the reversed cup-shaped member 43.

In this fourth example, the synthetic resin surface material 13 is sharply raised up apart from the ornamental member 12 by the action of the reversed cup-shaped member 43 to make large the distance or space between the synthetic resin surface material 13 and the ornamental member 12, so that a sharper cut line can be obtained than in the first to third examples.

Figure 10:
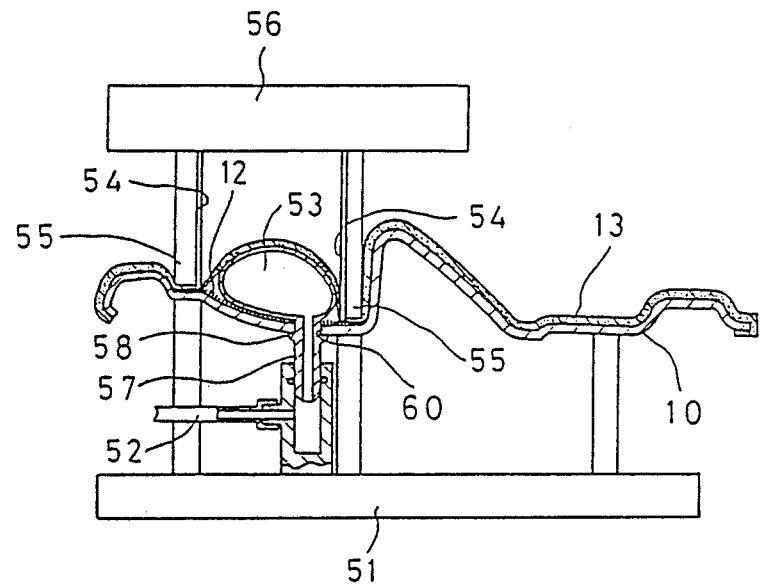
FIG. 10 is a partially cutaway front view showing a fifth example of the apparatus for carrying out the process of this invention.
Figure 11:
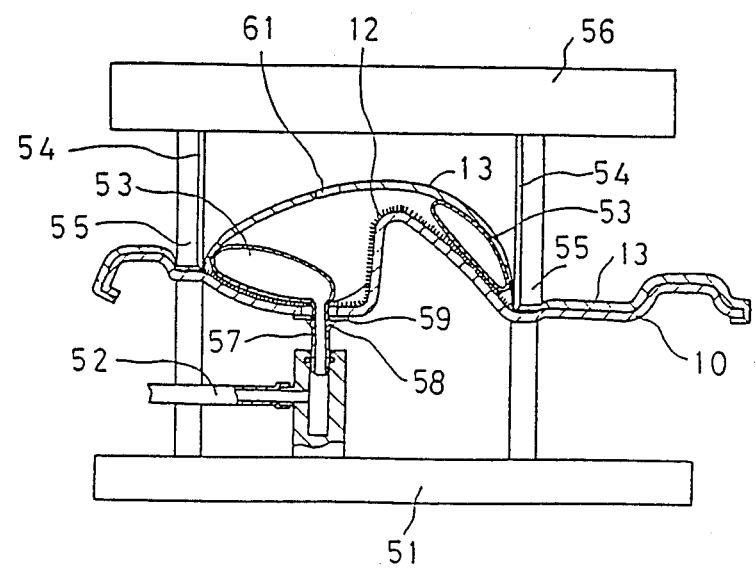
FIG. 11 and FIG. 12 are partially cutaway front views showing further examples of this invention.
Figure 12:
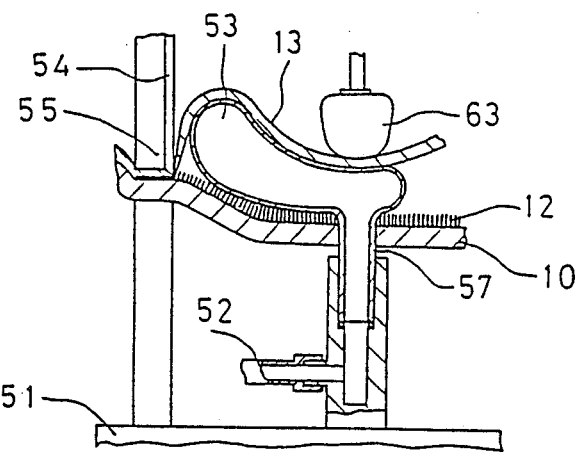

FIGS. 10 to 12 show illustrations of other examples of the apparatus according to this invention for practicing the present process to an intermediate product wherein the surface of the substrate 10 to which the ornamental member 12 has been applied is covered with a synthetic resin surface material 13; in which the numeral 51 denotes a lower platen for welding and melt-cutting the surface material 13 at a high frequency. The profile line of its upper end receiving face is designed to correspond to the outer shape of the ornamental member 12. The lower platen 51 is provided with a fluid supply pipe 52 connected at one end to a fluid supply source such as compressor, to be connectable at the other end to the bag member 53 described later. Also, on an upper portion of the lower platen 51, there is provided a matchably disposed frame-box type upper platen 56 comprising an electrode plate 55 equipped with a melt-cutter 54 at its lower end.

The numeral 53 denotes a bag member to be interposed between the ornamental member 12 of the substrate 10 and the synthetic resin surface material 13 having a supply pipe 57 to be connected to said fluid supply pipe 52 through which a fluid is supplied from said fluid supply pipe 52 to said bag member 53 to effect swelling thereof and to lift up the synthetic resin surface materials 13 at the part covering the ornamental member 12 It should be noted that in the drawings the numeral 58 is a flange for preventing slip off from the substrate 10, formed at the upper portion of the supply pipe 57; and the numeral 59 denotes a shim to be supported on the upper surface of the flange 58, if necessary, when the flange 58 has a too small diameter. The numeral 60 denotes an opening for inserting the supply pipe 57 of the bag member 53, provided in the substrate 10 at the part to which the ornamental member 12 has been applied.

In the fifth example of the present apparatus shown in FIG. 10, the bag member 53 is inserted into the hollow space in the upper surface of the ornamental member 12 through the opening 60 of the substrate 10 such that only the supply pipe 57 of the bag member 53 may remain in the back side of the substrate 10. The substrate 10 is then placed on the lower platen 51 such that the supporting face of the lower platen 51 is positioned under the peripheral edge of the ornamental member 12 provided on the upper surface of the substrate 10, and the supply pipe 57 in the back side of the substrate 10 is fit to the fluid supply pipe 52 to connect the bag member 53 and the fluid supply pipe 52 to allow said flange 58 to be in contact with the lower surface of the substrate 10 to obviate slipping off of the substrate 10.

The upper platen 56 is then descended and swelling of the bag member 53 is effected by supplying a fluid such as compressed air thereto through the supply pipe 57 from the fluid supply pipe 52 upon or immediately before contacting of the electrode plate 55 with the synthetic resin surface material 13, allowing the part of the synthetic resin surface material 13 located above the ornamental member 12 to be lifted up. When part of the synthetic resin surface material 13 is welded onto the peripheral edge of the ornamental member 12 by use of the electrode plate 55 by applying high frequency current under the above state, a weld line may be formed and the synthetic resin surface material 13 which had been made thin by the melt-cutter 54 may be spontaneously cut at the part having been made thin with the aid of the swelling power of the bag member 53. Then, the part of the synthetic resin surface material 13 covering the ornamental member 12 can be separated, and the surface material 13 thus separated can be removed from the spot after raising the upper platen 56.

It is also possible to allow the bag member 53 to further swell in effecting melt-cutting to enhance melt-cut efficiency. When part of the synthetic resin surface material 13 is welded along the peripheral edge of the ornamental member 12 in such a manner, at least the part of said synthetic resin surface material 13 adjacent to the weld line forming portion is lifted up from the surface of the ornamental member 12 in bringing the electrode plate 55 into contact with the synthetic resin surface material 13, to obviate contacting of said surface material with the nap portion. Thus, the nap portion will be less affected by the heat generated by the high frequency, heat conduction or heat pressure from the electrode plate 55, making it possible to prevent a whitening phenomenon which is liable to be generated along the weld line and eventually to provide an excellent product.

Figure 2:
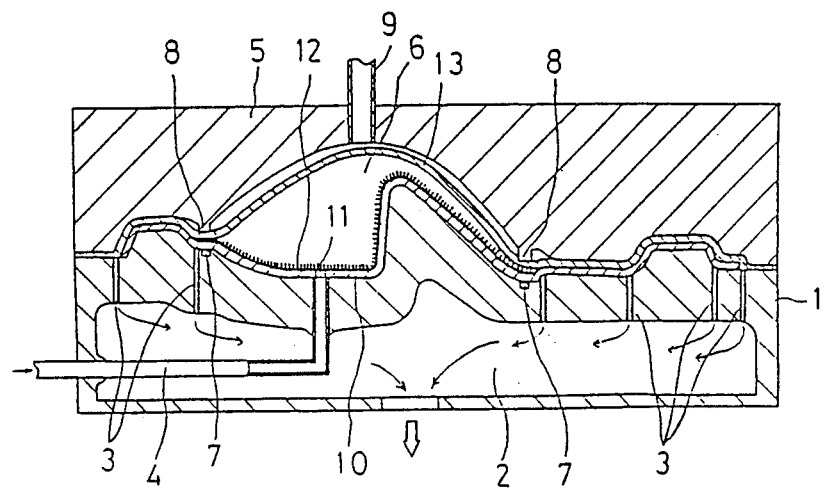
FIG. 2 is a partially cutaway front view of the same in a mold-closed state.
Figure 3:
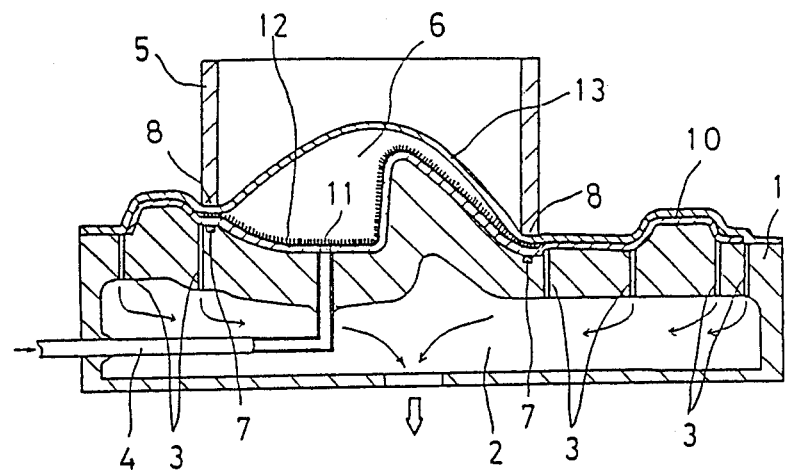
FIG. 3 is a partially cutaway front view showing another apparatus used for the vacuum forming step.
Figure 13:
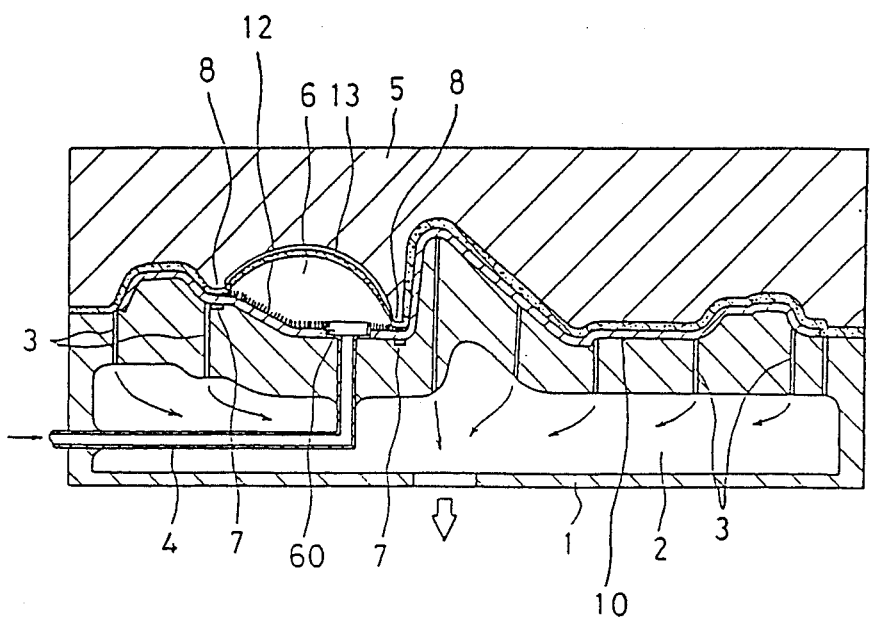
FIG. 13 is a partially cutaway front view showing another example of the apparatus used for a vacuum forming step which is a prior step of this invention.

In producing an intermediate product wherein the substrate 10 having the ornamental member 12 applied partly thereto is covered with the synthetic resin surface material 13, while a process may be used wherein nap-lying is prevented by allowing the synthetic resin surface material 13 not to be in contact with the part covering the ornamental member 12 during vacuum forming of the surface material 13 as in a method to be used for a vacuum forming device as shown in FIGS. 1 to 3 or a vacuum forming device which is used in processing the substrate 10 having an opening 60 as shown in FIG. 13, a process can also be utilized wherein a well known method is used in vacuum forming and only welding is effected by use of the present process, or a process wherein a welding process is effected simultaneously with the vacuum forming.

Alternatively, a process may be used wherein the lower platen is provided with an electrode plate, on which a substrate having a synthetic resin surface material thereunder is placed to effect welding even in the case where a welding process is carried out after obtaining an intermediate product. On the other hand, the bag member 53 may be of the type as shown in FIG. 10 which is designed to cover approximately the entire surface of the ornamental member 12, or may be in the form of a tubular ring to be positioned along the inside of the weld line as shown in FIG. 11.

Figure 14:
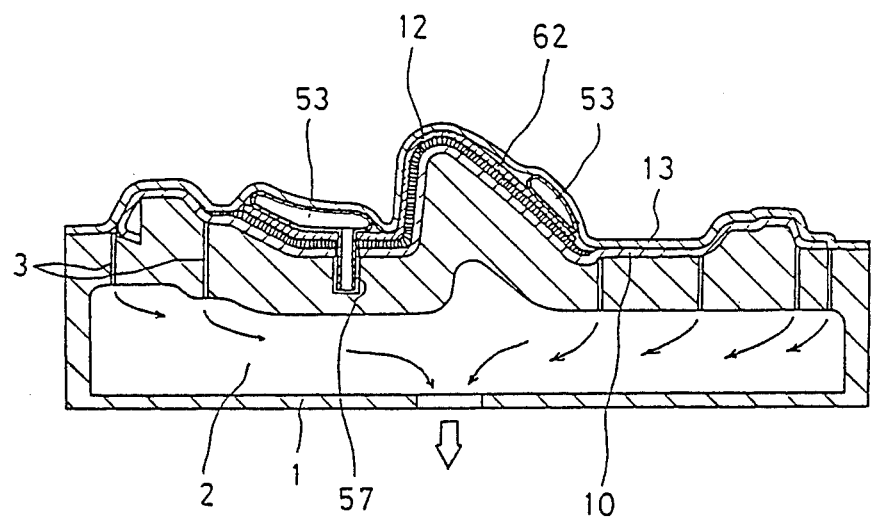
FIG. 14 is a partially cutaway front view of a lower platen of the apparatus showing another vacuum forming process.

Further, in the example shown in FIG. 10, while the supply pipe 57 of the bag member 53 is designed to be inserted from the opening 60 of the substrate 10, it is also possible, as shown in FIG. 11, to provide a slot 61 in the synthetic resin surface material 13 for inserting the bag member 53 therethrough; or as shown in FIG. 14, a cover 62 comprising a heat-resistant plate having a shape to cover the ornamental member 12 provided with a bag member 53, can be set in covering the substrate 10 with the synthetic resin surface material 13 and vacuum forming of the synthetic resin surface material 13 may be effected with the cover 62 contained thereunder to provide an intermediate product having the bag member 53 therein.

Still further, in order to prevent disconnection between the supply pipe 57 of the bag member 53 and the fluid supply pipe 52, while the flange 58 and shim 59 may be used as shown in the above example, a pressing mold 63 may also be used above the fluid supply pipe 52 to push down the swollen bag member 53 as shown in FIG. 12.

As can be seen clearly from the above description, products with good appearance may be obtained according to this invention, since the whitening phenomenon which may be caused by the excess of the synthetic resin surface material left along the weld line can be prevented, since welding and melt-cutting are effected with maintaining the part of the synthetic resin surface material covering the ornamental member to be lifted up in carrying out welding of the synthetic resin surface material along the peripheral edge of the ornamental member. Also, products can advantageously be manufactured at low costs because the synthetic resin surface material can be removed cleanly along the weld line with no residues to obviate the trouble of stripping it off manually, and also the apparatus is simple.

What is claimed is:

1. A process for producing interior vehicular trim, comprising:
   providing a substrate having a surface to be covered, a portion of said surface of said substrate being previously covered with a nap-raised ornamental member;
   covering said surface of said substrate, including covering said nap-raised ornamental member, with a synthetic resin surface material;
   welding said synthetic resin surface material to at least one of said substrate and said ornamental member at a peripheral edge of said ornamental member;
   melt-cutting said synthetic resin surface material at a peripheral edge portion of said ornamental member during said welding step, so as to define a melt-cutting line;
   lifting up by force said synthetic resin from the surface of said nap-raised ornamental member over the part of said synthetic resin surface material covering said nap-raised ornamental member, during said welding step such that said synthetic resin surface material is lifted up by force away from the nap-raised surface of said ornamental member during said welding step;
   said step of lifting up said synthetic resin surface material by force comprising increasing the air pressure in a space between said nap-raised ornamental member and said synthetic resin surface material to a value higher than the air pressure outside of said space; and
   removing said synthetic resin surface material at the part thereof covering said ornamental member and along said melt-cutting line.

2. The process of claim 1, wherein said step of increasing the air pressure in said space comprises increasing said pressure to from 2 to 6 kg/cm$^2$.

3. The process of claim 1, wherein said substrate has at least one opening therein, and wherein said step of increasing said air pressure in said space comprises forcing air into said space through said at least one opening of said substrate.

4. A process for producing interior vehicular trim, comprising:
   providing a substrate having a surface to be covered, a portion of said surface of said substrate being previously covered with a nap-raised ornamental member;
   covering said surface of said substrate, including covering said nap-raised ornamental member, with a synthetic resin surface material;
   welding said synthetic resin surface material to at least one of said substrate and said ornamental member at a peripheral edge of said ornamental member;
   melt-cutting said synthetic resin surface material at a peripheral edge portion of said ornamental member during said welding step, so as to define a melt-cutting line;
   lifting up by force said synthetic resin from the surface of said nap-raised ornamental member over the part of said synthetic resin surface material covering said nap-raised ornamental member, during said welding step such that said synthetic resin material is lifted up by force away from the nap-raised surface of said ornamental member during said welding step;
   said step of lifting up said synthetic resin surface material by force, comprising:
   interposing a bag member between said nap-raised ornamental member and said synthetic resin surface material; and
   inflating said bag member with a fluid supplied thereto to lift up said surface material and to also contribute to the melt-cutting of said surface material; and
   removing said synthetic resin surface material at the part thereof covering said ornamental member and along said melt-cutting line.

5. The process of claim 4, wherein said substrate has at least one opening therein, and wherein said inflating step comprises inflating said bag member through said at least one opening of said substrate.

6. The process of claim 4, wherein said substrate has at least one opening therein, and wherein said step of interposing said bag member between said ornamental member and said synthetic resin surface material comprises inserting said bag member through said at least one opening into said space, and then inflating said bag member with said fluid through said at least one opening of said substrate.

7. The process of claim 4, wherein said step of interposing said bag member between said ornamental member and said synthetic resin surface material comprises interposing a generally ring-shaped bag member between said ornamental member and said surface material, said generally ring-shaped bag member being arranged adjacent a weld line formed during said welding step and said melt-cutting line.

8. A process for producing interior vehicular trim, comprising:
   providing a substrate having a surface to be covered, a portion of said surface of said substrate being previously covered with a nap-raised ornamental member;
   covering said surface of said substrate, including covering said nap-raised ornamental member, with a synthetic resin surface material;
   welding said synthetic resin surface material to at least one of said substrate and said ornamental member at a peripheral edge of said ornamental member;
   melt-cutting said synthetic resin surface material at a peripheral edge portion of said ornamental member during said welding step, so as to define a melt-cutting line;
   lifting up by force said synthetic resin from the surface of said nap-raised ornamental member over the part of said synthetic resin surface material covering said nap-raised ornamental member, during said welding step such that said synthetic resin surface material is lifted up by force away from the nap-raised surface of said ornamental member during said welding step;
   said step of lifting up said synthetic resin surface material by force comprising:

engaging said synthetic resin surface material with at least one suction member; and lifting said surface material from said ornamental member under force from said at least one suction member; and removing said synthetic resin surface material at the part thereof covering said ornamental member and along said melt-cutting line.

9. A process for producing interior vehicular trim, comprising:

providing a substrate having a surface to be covered, a portion of said surface of said substrate being previously covered with a nap-raised ornamental member;

covering said surface of said substrate, including covering said nap-raised ornamental member, with a synthetic resin surface material;

welding said synthetic resin surface material to at least one of said substrate and said ornamental member at a peripheral edge of said ornamental member;

melt-cutting said synthetic resin surface material at a peripheral edge portion of said ornamental member during said welding step, so as to define a melt-cutting line;

lifting up by force said synthetic resin from the surface of said nap-raised ornamental member over the part of said synthetic resin surface material covering said nap-raised ornamental member, during said welding step such that said synthetic resin surface material is lifted up by force away from the nap-raised surface of said ornamental member during said welding step;

said step of lifting up said synthetic resin surface material by force comprising reducing the pressure in a chamber located adjacent said synthetic resin surface material at least over the portion thereof covering said nap-raised ornamental member, the pressure in said chamber being reduced to a pressure below the pressure in a space between said ornamental member and said synthetic resin surface material; and removing said synthetic resin surface material at the part thereof covering said ornamental member and along said melt-cutting line.

* * * * *